United States Patent
Lowry et al.

[11] Patent Number: 6,035,701
[45] Date of Patent: Mar. 14, 2000

[54] METHOD AND SYSTEM TO LOCATE LEAKS IN SUBSURFACE CONTAINMENT STRUCTURES USING TRACER GASES

[76] Inventors: William E. Lowry, 17 Valencia Loop, Sante Fe, N.Mex. 87505; Sandra Dalvit Dunn, 267 Hyde Park Estates; Robert Walsh, 1553 Camino Amado, both of Santa Fe, N.Mex. 87501; Daniel Merewether, 62A Entrada La Cienega; Desario V. Rao, 23 Cuesta Rd., both of Santa Fe, N.Mex. 87505

[21] Appl. No.: 09/060,952

[22] Filed: Apr. 15, 1998

[51] Int. Cl.⁷ .............................. G01M 3/22; B09B 1/00; E02D 3/00; G01N 33/22
[52] U.S. Cl. .............................. 73/40.7; 73/49.2; 405/54; 405/129; 340/605
[58] Field of Search ................................ 73/40.7, 40.5 R, 73/49.2, 40.5 A; 340/605; 405/52, 129, 54, 128

[56] References Cited

U.S. PATENT DOCUMENTS

| | | |
|---|---|---|
| 4,031,742 | 6/1977 | Michael et al. ........................... 73/40.7 |
| 4,690,689 | 9/1987 | Malcosky et al. ......................... 48/174 |
| 4,725,551 | 2/1988 | Thompson .................................. 436/3 |
| 5,048,324 | 9/1991 | Thompson ................................ 73/40.7 |
| 5,076,728 | 12/1991 | Golding ................................... 405/128 |
| 5,163,315 | 11/1992 | Asai et al. ................................ 73/40.7 |
| 5,269,172 | 12/1993 | Daigle et al. ............................. 73/40.7 |
| 5,377,307 | 12/1994 | Hoskins et al. ............................ 395/22 |
| 5,447,055 | 9/1995 | Thompson et al. ....................... 73/49.2 |
| 5,502,268 | 3/1996 | Cote et al. ................................ 588/259 |
| 5,591,115 | 1/1997 | Raimondi et al. ....................... 588/249 |
| 5,635,712 | 6/1997 | Scott, III et al. ........................ 250/260 |
| 5,763,360 | 6/1998 | Gundel et al. ........................... 502/402 |

*Primary Examiner*—Hezron Williams
*Assistant Examiner*—J. David Wiggins
*Attorney, Agent, or Firm*—DeWitt M. Morgan, Esq.

[57] ABSTRACT

The present invention integrates an inverse modeling technique and a field measurement system. The system uses inexpensive and non-hazardous gaseous tracers injected inside the contained volume of a barrier to quantify the location and size of any leaks in the barrier. The vapor sampling point installation, which allows the collection of soil gas samples from multiple points around the barrier installation, can be accomplished with conventional drilling or direct push techniques. The system uses a field-proven soil gas analyzer, incorporated in a sampling system capable of monitoring many sample points with relatively high time resolution. A rigorous inverse modeling technology is integrated with the data system for real time analysis.

29 Claims, 7 Drawing Sheets

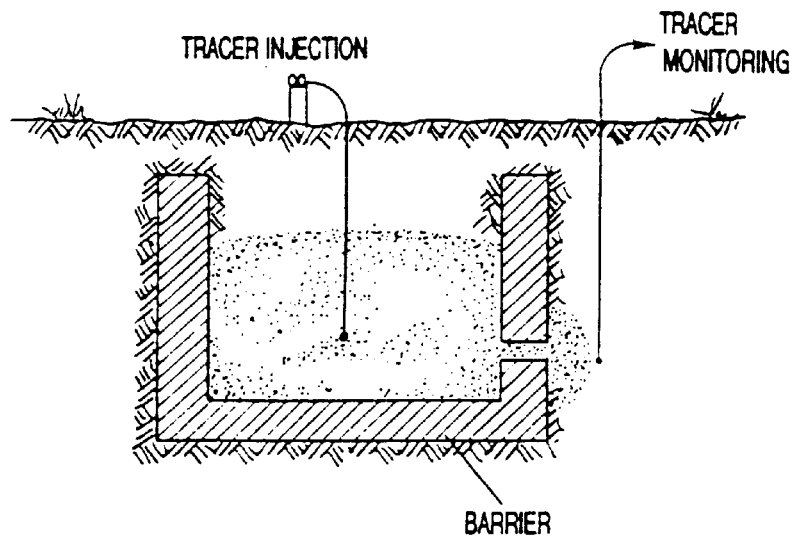
FIG-1
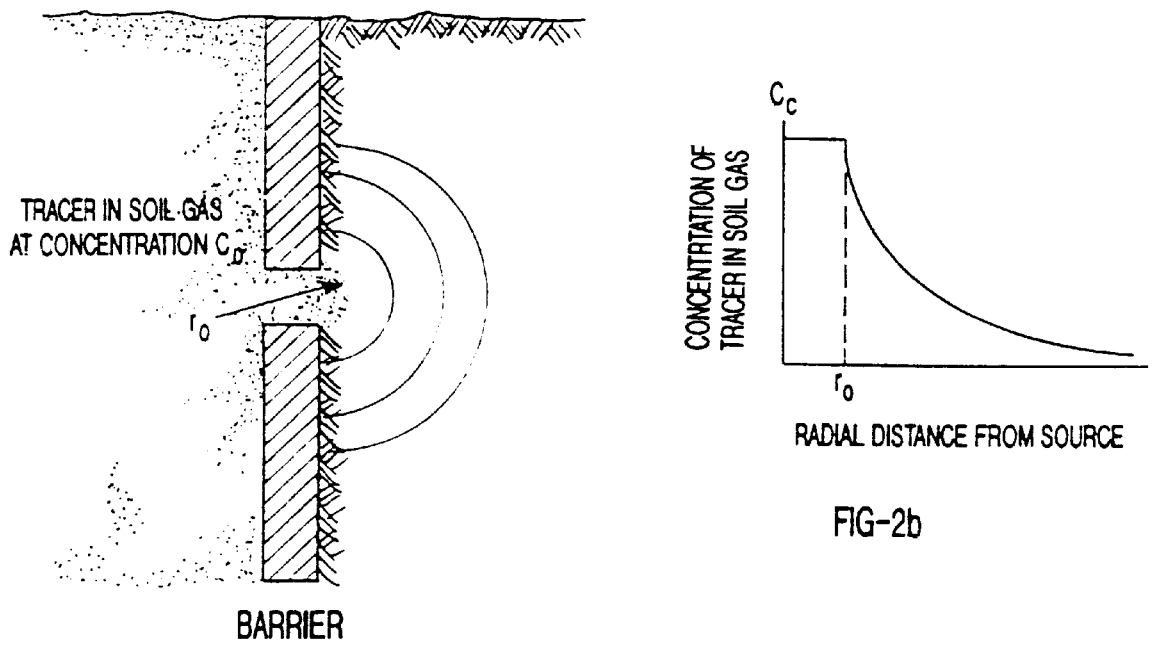
FIG-2a
FIG-2b

MONITOR POINTS 2, 3, 4, 6, AND 7 WERE CLOSE ENOUGH TO THE LEAK TO DETECT THE TRACER WITHIN THE FIRST 30 DAYS AFTER THE LEAK BEGAN (USING BASELINE CASE 1 INFORMATION).

METHOD AND SYSTEM TO LOCATE LEAKS IN SUBSURFACE CONTAINMENT STRUCTURES USING TRACER GASES

FIELD OF THE INVENTION

This invention relates to quantitative subsurface barrier assessment systems using gaseous tracers to pinpoint leak sources and sizes in real time. The invention is applicable to impermeable barrier emplacements above the water table to provide a conservative assessment of barrier integrity as well as long term integrity monitoring.

BACKGROUND OF THE INVENTION

The Department of Energy is currently developing in-situ barrier emplacement techniques and materials for the containment of high-risk contaminants in soils. Injected grouts, waxes, polymers, slurries and freezing of soil moisture are barrier techniques currently under development and/or being demonstrated. Because of their relatively high cost, the barriers are intended to be used in cases where the risk is too great to remove the contaminants, the contaminants are too difficult to remove with current technologies, or the potential movement of the contaminants to the water table is so high that immediate action needs to be taken to reduce health risks. Consequently, barriers are primarily intended for use in high-risk sites where few viable alternatives exist to stop the movement of contaminants in the near term. The intent of these designs is to prevent the movement of contaminants in either the liquid or vapor essentially buying time until remediation can be implemented or until the contaminant depletes naturally. Assessing the integrity of the barrier once it is emplaced, and during its anticipated life, is a very difficult but necessary requirement.

Surface based geophysical techniques, such as ground penetrating radar, electromagnetic, or seismic surveys, can only detect the presence of barrier materials in the soil. They are incapable of resolving imperfections on the scale of fractions of an inch, which is required to assess the integrity of these subsurface structures. Borehole geophysical techniques (neutron, gamma, EM and acoustic tomograph) are potentially capable of the required resolution, but because of the measurement depth (fractions of meters) necessary to attain the desired resolution, many closely spaced access holes are needed to perform the integrity validation function. Because of the limitations in geophysical techniques (and limited hope that their resolution can be practically improved) gaseous tracers have been suggested. See "Subsurface Barrier Verification Technologies," J. H. Jeiser, BNL-61127, Brookhaven National Laboratory, June 1994.

Tracers have been used previously for landfill liner and underground storage tank leak detection. A typical usage is to inject small amounts of perfluorocarbon tracer gas and monitor for its appearance on the other side of an impermeable layer (such as landfill liner or UST wall). Several different tracers can be used to distinguish leak locations. Gas analysis is usually done with GC-MS or similar sophisticated analytic device, and inference of leakage characteristics accomplished by post test analysis of the soil gas data. This is a time consuming, artful process. The challenge with the use of tracers is to develop a system which automatically assesses barrier integrity in real time, to avoid time consuming and expensive numerical back-calculations.

The present invention is a turn-key, autonomous monitoring system to provide leakage characteristics in real time. This will significantly reduce the labor required for assessment of barrier integrity. The conservative vapor testing methodology, combined with the real time assessment, introduces the possibility that breaches in a barrier can be repaired before liquid contaminant is released from the contained volume.

The present invention has the following benefits:
Reducing public and occupational health risks by assuring that the integrity of barriers intended to contain high risk contaminants. As such, it will quantify leaks so that remedial actions (repairs) can be accomplished to minimize risk to the public. The method of sampling system installation (direct push or ResonantSonic™) minimizes occupational risk by reduction of secondary waste generation.
Improving cleanup operations by assuming that barriers are constructed as desired.
Cost reduction.
Ability to meet regulatory requriements.

The present invention is applicable to the assessment of any impermeable barrier constructed above the water table. Furthermore, the system is equally capable of performing as the long term monitoring system of the barrier's integrity.

SUMMARY OF THE INVENTION

The present invention integrates an inverse modeling technique and a field measurement system. The system uses inexpensive and non-hazardous gaseous tracers injected inside the contained volume of a barrier to quantify the location and size of any leaks in the barrier. The vapor sampling point installation, which allows the collection of soil gas samples from multiple points around the barrier installation, can be accomplished with conventional drilling or direct push techniques. The system uses a field-proven soil gas analyzer, incorporated in a sampling system capable of monitoring many sample points with relatively high time resolution. A rigorous inverse modeling technology is integrated with the data system for real time analysis.

The invention is applicable to impermeable barrier installations above the water table. The system requires that multiple vapor sampling points be installed around the perimeter of the barrier, and one or several tracer injection points be emplaced inside the contained volume. Vapor point installation can be accomplished in virtually any geologic media, using a variety of techniques. Grout wall, cryogenic, viscous, and sheet barriers are all viable applications for the disclosed monitoring system. To date, potential Department of Energy ("DOE") installations exist at Hanford, Oak Ridge, Savannah River, and Portsmouth.

The present invention uses gaseous tracer injection, in-field real-time monitoring, and real time data analysis to evaluate barrier integrity in the unsaturated zone. The design has the following features:
It measures vapor leaks in a containment system whose greatest risk is posed by liquid leaks;
It is applicable to any impermeable barrier emplacement technology in the unsaturated zone;
It qualifies both the leak location and size;
It uses readily available, non-toxic, inexpensive, nonhazardous gaseous tracers;

The vapor injection and sampling points can be emplaced by direct push techniques (such as Geoprobes) or the rapid ResonantSonic™ technique, avoiding excessive drilling costs and secondary waste generation;

It provides continuous and unattended contaminant plume measurements for remote site operation;

In incorporates the methodology for unfolding the soil gas analysis data in real time using a rigorous inverse modeling technique which accommodates uncertainties in field data; and In addition to assessing initial barrier integrity, the system can also provide long term monitoring of contaminant soil gases for surveillance of the containment system's performance over time.

The barrier monitoring system of the present invention is predicated on the very simple and predictable transport process of binary gaseous diffusion in porous media. A hole or similar imperfection in a barrier will allow tracer gas to diffuse through at a rate orders of magnitude greater than through the solid barrier material. If the hole is small relative to the surface area of the barrier, the tracer gas will diffuse away from the source in a spherical fashion.

Spherical diffusion is utilized for leak detection because the tracer concentration histories measured at locations distant from the source are highly sensitive to both the size of the leak and the radial distance from the leak source. This sensitivity allows an effective inverse modeling methodology to be applied to recorded concentration histories at several points around the barrier. The technique, known as simulated annealing, iterates to a leak site and location by minimizing errors in the transport calculations. It is a rigorous generalized methodology which can accommodate real world uncertainties.

BRIEF DESCRIPTION OF THE DRAWINGS

FIG. 1 is a schematic view of the barrier test configuration;

FIG. 2(a) is schematic view of the leak process model;

FIG. 2(b) is a graph illustrating the tracer diffusion model;

DESCRIPTION OF THE PREFERRED EMBODIMENT

The basic approach to using gaseous tracers for barrier integrity assessment is to inject a tracer gas into the barrier-contained volume, then monitor outside of the contained volume for indications of leaks. The dominant transport process in this case is molecular diffusion, driven by concentration gradients of the tracer gas in the soil. This is depicted schematically in FIG. 1.

To understand the suitability of this approach, consider the configuration shown in FIG. 2(a). A tracer has been injected into a contained volume. An imperfection (e.g. hole) exists in the container, with a cross sectional area $A_{leak}$. If the tracer concentration inside the container is high, it will serve as an infinitely large reservoir of tracer gas at a fixed concentration $c_o$. The tracer gas will diffuse from the leak in roughly a spherical flow geometry, especially if $A_{leak}$ is small compared to the size of the container, and the wall of the container forms a flat no-flow boundary. Tracer transport is modeled, at least to the first order, as one-dimensional spherical diffusion from a source with the radius $r_o$. This is represented in FIG. 2(b) schematically. The partial differential equation describing this transient spherical process is the diffusion equation:

$$\frac{\partial c}{\partial t} = \frac{D}{r^2}\frac{\partial}{\partial r}\left(r^2\frac{\partial c}{\partial r}\right) \qquad [\text{Eq. 1}]$$

where c is the concentration at radial position r and time t. The controlling parameter in this process is D, the diffusivity of the tracer in soil gas, which includes the effects of soil tortuosity and porosity. To solve this equation we set the left boundary condition as:

$$c(r_o,t)=c_o \ t\geq 0$$

and solve for a semi-infinite medium whose initial tracer concentration is zero. This results in a straightforward expression of the tracer concentration:

$$c(r, t) = \frac{r_o}{r}c_o\left[1 - \mathrm{erf}\sqrt{\frac{(r-r_o)^2}{D4t}}\right] \qquad [\text{Eq. 2}]$$

Figure 3:
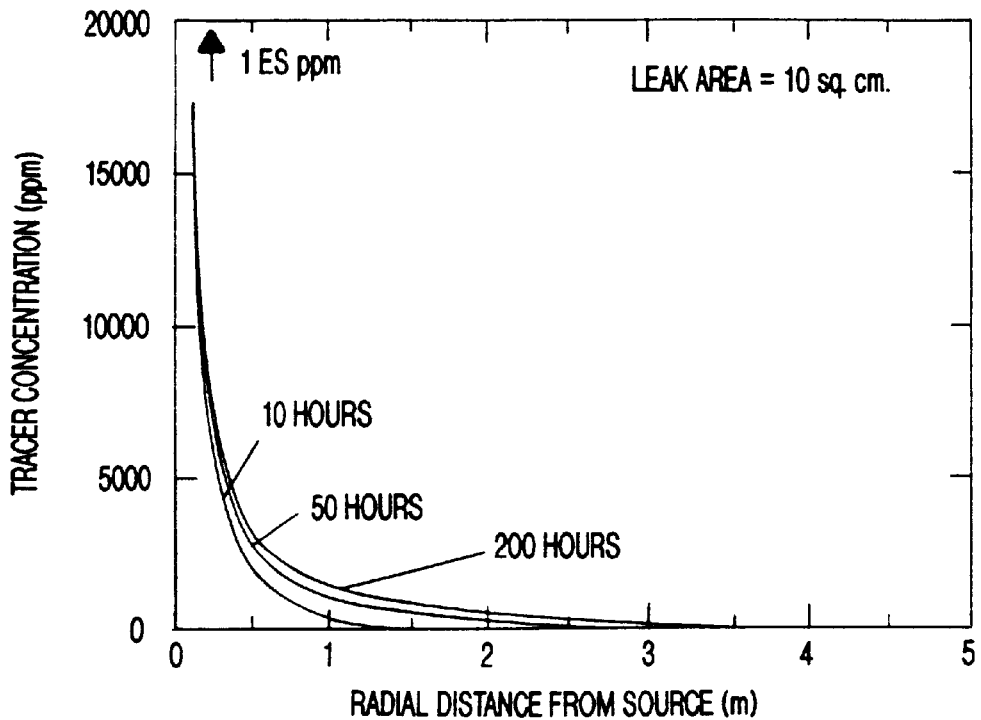
FIG. 3 is a graph illustrating the tracer concentration profile at various times (10 cm² leak)

To illustrate the potential for delineating leak location and size, consider several simulations. The modeled source is a constant concentration of 10 percent (100 ppm) $SF_6$ (sulfur hexafluoride) in soil gas (air). The diffusivity is $10^{-5}$ $m^{2/s}$, a typical value in soils for heavier compounds such as sulfur hexafluoride. The leak is represented by a constant source concentration with a source radius, $r_o$, chosen to represent $A_{leak}$ (i.e., $A_{leak}=\pi r_o^2$). using the foregoing parameters, two simulations were conducted: one with a leak area of 10 cm², and the other 1 cm². The significant results are:

1. The process is relatively fast for the modeled leak sizes. As seen in FIG. 3 the progression of the tracer concentration profile out in the soil is plotted for the 10 cm² leak. In roughly a one-week period, the fringe of the tracer "plume" has extended to 5 meters. Consequently, this allows a tradeoff between test duration and probe spacing.

Figure 4:
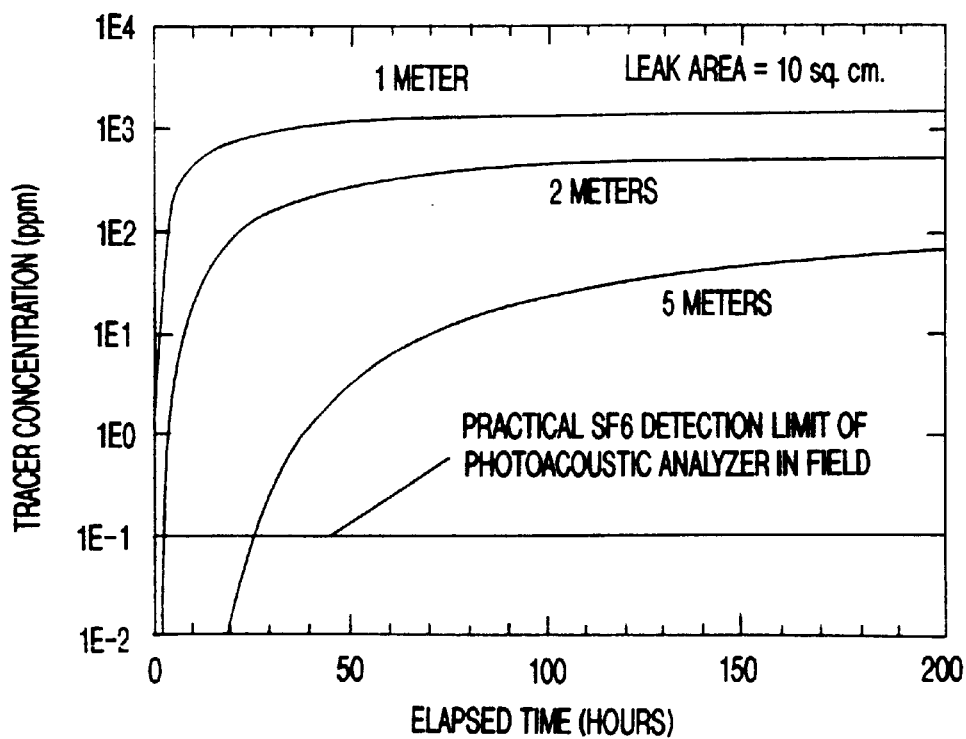
FIG. 4 is a graph illustrating tracer concentration model at 3 radial distances from source (10 cm² leak)

1. The concentration histories are very sensitive to distance from the source. The sensitivity of the measurement to distance from the source is shown in FIG. 4. At early times the concentration predicted at 2 m is more than two decades higher than that measured at 5 m. As the transport reaches steady state, the concentrations will be inversely proportional to radial distance from the source (r in Equation 2).

Figure 5:
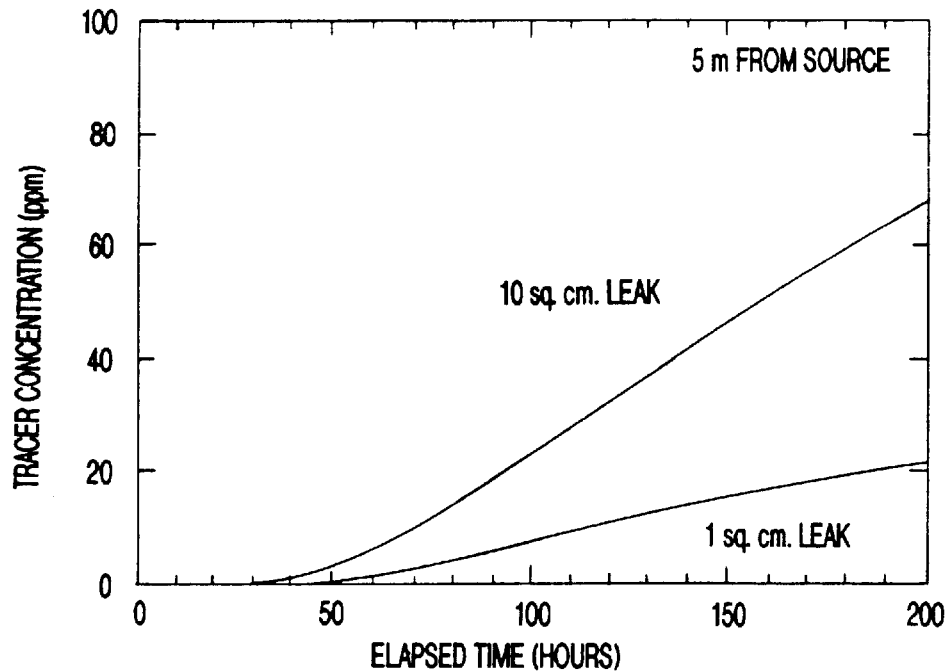
FIG. 5 is a graph illustrating tracer concentration at 5 meters from source for two different leak sizes.

1. Different leak sizes can be distinguished. The concentration histories at 5m from the two different size sources are shown as FIG. 5. The smaller leak results in lower amplitude response (although the arrival time of the front is similar in both cases). The amplitude is directly proportional to the leak radius, or the square root of the leak area. The above described monitoring approach allows for quantitative location of the leak by triangulation of concentration histories from three sample points (using probes placed 5 to 10 m apart, for example) and determination of the leak size by evaluating the magnitude of the concentration response. The simplicity of the transport equation allows an easy test of a rigorous inverse modeling technique to automatically determine leak location and size given soil gas analysis records.

Inverse modeling is used to reverse calculate flow and transport processes in an effort to understand unknown properties and flow conditions. This can be accomplished with numerical or analytical techniques, depending upon the complexity of the process and the detail required in the final result.

For the present invention a numerical method was chosen which would allow near real time assessment of recorded gas data. Consequently, the solution method chosen is readily programmed for use on a portable personal computer, which also performs the role of controlling data acquisition, archiving data, and reporting/transmitting the results.

The estimation of the size and location of a leak from measured concentration histories is an inverse problem of multiphase flow in porous media. From measured tracer concentrations $C_{ik}$ taken at locations, $\underline{x}_i = (x_i, y_i, z_i)$ and times $t_{ik}$ one seeks estimates for a set of parameters p that characterize the leak.

The inverse problem requires a leakage model $$c(p; \underline{x}, t)$$

that solves the forward problem; that is, it maps each point p from a multiparameter space into a set of predicted concentration histories. For example, an idealized leakage model for a vertical barrier surface described by y=a+bx is $$c(\underline{p}; x, t) = \frac{r_o}{r} c_o \operatorname{erfc}\left(\sqrt{\frac{(r-r_c)^2}{4D(t-t_o)}}\right), r > r_o, t > t_o \quad \text{[Eq. 3]}$$

where $$r^2 = (x - x_o)^2 + (y - y_o)^2 + (z - z_o)^2,$$
$$y_o = a + bx_o,$$

($x_o$, $y_o$, $z_o$) is the location of the leak, $t_o$ is the time that the leak began, $r_o$ is the constant radius of the leak after time to, $c_o$ is the uniform tracer concentration within the hemisphere of radius $r_o$ after time $t_o$, D is the uniform diffusivity of the medium, and erfc(x) is the complement of the error function. In the idealized case at least the first four parameters are unknown. In a realistic application the model may be more complex, perhaps a finite element model, and there may be many unknown parameters.

The inverse problem is cast in the form of a nonlinear global optimization problem. The objective function to be minimized is taken as the sum of the squares of the differences between predicted and measured tracer concentrations:

$$E(\underline{p}) = \sum_{i,k} [c(\underline{p}; x_i, t_{ik}) - C_{ik}]^2 \quad \text{[Eq. 4]}$$

The problem is made difficult by the fact that there may be more than one set of parameter values for which E achieves the minimum.

No algorithm can solve a general, smooth global optimization problem in finite time. This fact has lead to the use of stochastic methods, some of which are called "Simulated Annealing" ("SA").

The simplest stochastic method for global optimization is to repeatedly select points in the parameter space at random, using a uniform probability distribution (i.e., Pure Random Research). The objective function is evaluated at each point; the minimum value and the point with the minimum value are remembered, all other information is discarded. Even with a large sample of points, the Pure Random Search method may not find the global minimum, but it probably will come close. As the sample increases, the probability of success converges to 1.

SA methods are similar to Pure Random Search. Points are selected at random and the best point is remembered. The difference is that an SA method does not use a uniform distribution to select points in the parameter space. Instead, the probability distribution depends in a complex way on the objective function of previous points.

In an SA method the probability distribution for the next point is centered around a particular point in parameter space, which we call the base point, by analogy to a base camp. As discussed below, the base point need not be the best point found so far. One way in which various SA methods differ from each other is in the exact form of the probability distribution.

The rule for determining the base point is responsible for the name Simulated Annealing. If the objective function is smaller at the next point than it was at the base point, then the base point is moved to the new point. If the objective function is larger, we take a chance on moving the base point; we "roll the dice". If the objective function is much larger at the next point, the probability of moving the base point is less, because that probability is given by the following expression:

$$e^{-\Delta E/T} \quad \text{[Eq. 5]}$$

This is analogous to the physical annealing process, where $\Delta E$ is the difference in energy states and T is proportional to the temperature. When T is relatively large, there is a good possibility that the base point will climb out of a local minimum to look for other minima. If T is small, the base point is more likely to avoid "uphill" steps. In an SA method, the temperature is reduced as the process proceeds, just as in physical annealing.

SA methods not only differ in the form of the probability distribution used to select the new point, they also differ in the cooling schedule.

To select the next set of parameter values to be tested, each parameter is selected independently, using a probability distribution proportional to $$e^{-W|p_j-q_j|/(M_j-m_j)} \quad \text{[Eq. 6]}$$

where p and q are the new point and the base point, respectively, $[m_j, M_j]$ is the interval of allowed values of $p_j$, and W is a shape constant. This is a relatively simple probability distribution that satisfies the requirements that the probability density be positive over all possible parameters values and that the density be a maximum at the base point.

In order to assure that T converges to zero even when Eo is underestimated, the present algorithm uses $$T = V \frac{E(p_b) - E_o}{\ln(n+1)} \quad \text{[Eq. 7]}$$

where n is the number of points for which E has been evaluated and V is a constant. The value for $E_o$ is based on the fractional measurement errors ei at the various monitors; that is, $$E_o = \sum_i c_i^2 \left( \sum_k C_{ik}^2 \right). \quad \text{[Eq. 8]}$$

For the calculations reported here, V was set to 100. With this choice, the probability of accepting a point that would "double" the error is about 98.6 percent for n=1 and about 86 percent for n=2000.

An SA algorithm needs a stopping rule, which tends to be problem-dependent. The present algorithm stops a search when $E(p) \leq E_o$ or after a fixed number of evaluations N.

In order to estimate the uncertainty in the result, several sequences are run, each starting from the same initial p but using a different sequence of random numbers. Because of this repetition, it is reasonable to use a relatively small value of N for each search.

This iterative methodology was incorporated into a C++ code developed to run on a standard personal computer. Tests with simulated soil gas concentration histories from a one-dimensional spherical diffusion model were conducted to demonstrate the methodology. Results are described below.

Testing of the code was performed by generating concentration histories for monitoring points in a typical barrier monitoring/verification configuration. The sample configuration, illustrated in FIG. 6, included a vertical barrier 100 ft deep and 200 ft wide. Four multipoint monitoring wells were located in a plane 20 ft from the outside surface of the barrier. The 40 ft spacing of the points within each well was equal to the spacing of the wells from one another. This spacing allowed for all points on the surface of the barrier except those near the top and side edges to be within 30 ft of a monitoring point. The location of the leak was arbitrarily chosen. The distance from the leak center to each monitoring point was calculated, and a one-dimensional radial analytic solution for molecular diffusion was used to generate concentration histories at each of the monitoring points. The total number of times (i.e., 30) calculated for each point was chosen assuming a soil gas sample would be collected once a day with data downloaded from the MultiScan™ system once every 30 days. In calculating the concentrations, it was assumed that the barrier did not begin to leak until the beginning of the 8th day after the last collection time. Two different leak radii, 10 cm and 1 m, were used in the calculations. Once concentrations were calculated from the analytical solution, random errors were incorporated in the values. It was assumed that under field conditions the gas analyzer could measure the tracer gas to within ±5 percent accuracy for values under 500 ppm, and within ±10 percent for values over 500 ppm. These inaccuracies are greater than what should actually be measured, but were used in an effort to be conservative. Even though the gas analyzer can measure $SF_6$ to 50 ppb in laboratory analysis, a 1 ppm lower detection was assumed for the field conditions. The source concentration of the tracer used in calculations was 70,000 ppm, the upper calibrated detection limit of the gas with the proposed gas analyzer. The effective diffusion constant of the tracer in the soil gas was assumed to be $1.0(10^{-5})$ m²/s. This value was measured in the vadose zone at the Chemical Waste Landfill at Sandia National Laboratory, Albuquerque, N.M., and accounts for soil porosity and tortuosity.

Figure 6:
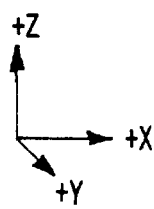
FIG. 6 is perspective schematic illustrating the sample configuration for inverse model assessment.
Figure 6:
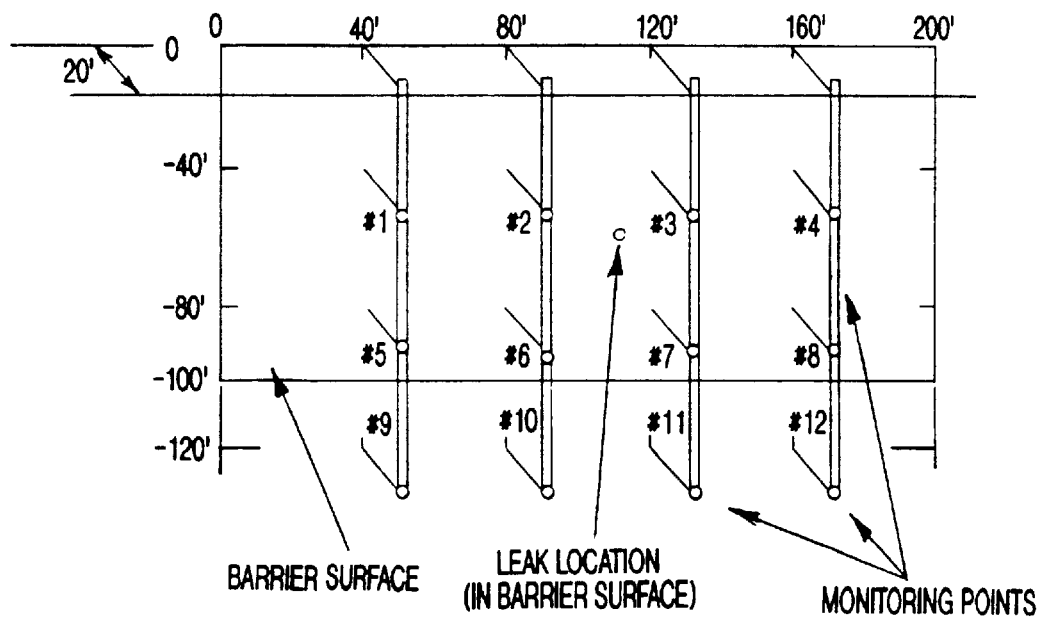
Figure 7A:
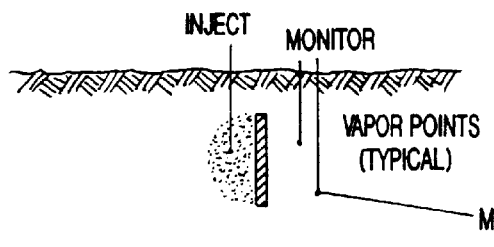
FIGS. 7(a)–(e) illustrate potential barrier installations and monitoring configurations.
Figure 7B:
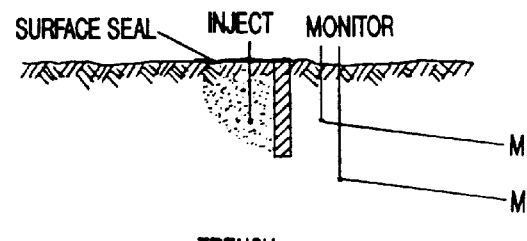
Figure 7C:
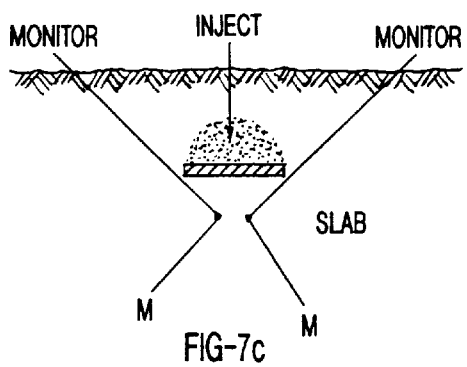
Figure 7D:
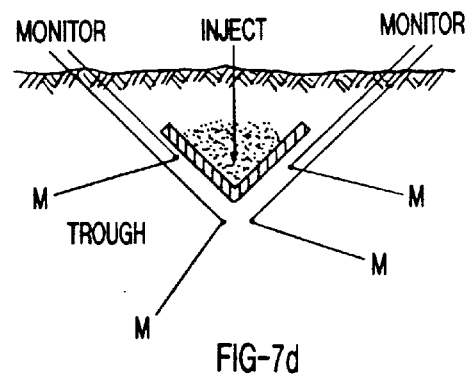
Figure 7E:
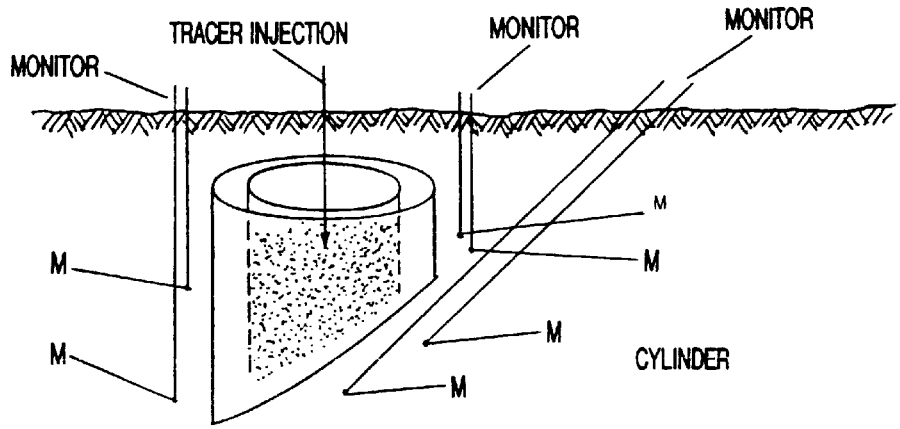

The code allows for a range of values to be input for all of the pertinent variables. Ranges for the x and z location of the leak on the barrier were chosen based on the monitor information (the barrier was vertical and coordinates chosen such that y=0). The monitors closest to the leak will detect the tracer earliest and will measure the highest concentrations with time. Thus a cursory overview of the collected data will allow the user to determine a very general location of the leak. FIG. 6 shows the coordinate system used to generate the input file and lists the monitoring points which are close enough to the leak to detect the tracer gas. For the baseline case, the area of the barrier searched to find the leak was 24.38<x<48.77 and −21.34<z<−9.14 meters. The range of the tracer source concentration was ±10 percent of the "known" source concentration of 70,000 ppm for the baseline case (this value would be measured in the field). Comparison runs were performed where the range was increased to ±30 percent (50,000<source concentration<90,000 ppm). The effective diffusivity of the medium was entered as a constant of 1.0 $(10^{-5})$ m²/s in the baseline case, with comparison runs changing the range to 5.0 $(10^{-6})$ to 1.5 $(10^{-5})$ m²/s. Additionally, changes to the base runs were made to determine the effect of other potential errors from field conditions. The input locations of the monitoring points were altered in one run so that they were one to 2.25 meters off from their true location.

Table 1 shows several examples of the input parameters for the analytic calculations and the codes. The code was consistently able to accurately determine the location of the leak. For most of the cases, the calculated X, Z locations were within 0.5 m of the actual values. Calculation of the leak radius also showed good agreement with the actual values, within 20 percent. In most cases, the best fit was very close to the real value, and in all cases, the calculated range of values did encompass the true value. The code was also able to determine the time the leak began to accuracies of less than ±2 days. As expected, as more unknowns were introduced into the code (as larger ranges) or as the accumulation of errors increased in calculating the analytic histories, the accuracy of the code diminished. However, even under the worst case simulated conditions, results were still good. Under true field conditions where additional data and monitor points would be included in the calculations with time, the results would continue to become more accurate.

These simulations were completed on a 133 MHz Pentium PC, requiring four hours for the case with the greatest number of iterations. No effort was made to optimize the runs.

barrier, at a prescribed concentration, to diffuse uniformly into the contained volume.

One of the benefits of using $SF_6$ is its relatively high molecular weight (146) which results in it tending to stay inside a contained volume (at least in high concentrations) and it is a reasonable surrogate for some of the heavier contaminants of interest (such as TCE and $CCl_4$). It is a relatively inexpensive tracer material: a 1000 m+$^3$ volume of soil (30 percent porosity) would require 185 kg of SF6 to achieve a 10 percent concentration, costing $3000. $SF_6$ has

TABLE 1

Sampling of input parameters for the analytic calculations plus the codes results.

|  | Baseline case with small leak radius | Small leak radius case with ranges for concentration and diffusivity | Baseline case with large leak radius | Large leak radius case with ranges for concentration and diffusivity |
|---|---|---|---|---|
| PARAMETERS USED TO CALCULATE CONCENTRATION HISTORIES | | | | |
| Leak location (X, Y, Z) meters | 32.92, 0, −14.02 | 32.92, 0, −14.02 | 32.92, 0, −14.02 | 39.92, 0, −14.02 |
| Monitor location (X, Y, Z) meters | | | | |
| #1 | 48.78, 6.10, −9.14 | 48.78, 6.10, −9.14 | 48.78, 6.10, −9.14 | 48.78, 6.10, −9.14 |
| #2 | 24.38, 6.10, −21.34 | 24.38, 6.10, −21.34 | 24.38, 6.10, −21.34 | 24.38, 6.10, −21.34 |
|  | 24.38, 6.10, −21.34 | 24.38, 6.10, −21.34 | 24.38, 6.10, −21.34 | 24.38, 6.10, −21.34 |
| #3 | 36.58, 6.10, −21.34 | 36.58, 6.10, −21.34 | 36.58, 6.10, −21.34 | 36.58, 6.10, −21.34 |
| #4 | 36.58, 6.10, −9.14 | 36.58, 6.10, −9.14 | 36.58, 6.10, −9.14 | 36.58, 6.10, −9.14 |
| #5 | | | | |
| Accuracy of monitor locations (m) | ±0 m | ±0 m | ±0 m | |
| Accuracy of range of measured concentrations (≦500 ppm) | ±5% | ±5% | ±5% | ±5% |
| Accuracy of range of measured concentrations (>500 ppm) | ±10% | ±10% | ±10% | ±10% |
| Leak radius (m) | .1 | .1 | 1 | 1 |
| Effective diffusive constant of tracer through medium (m$^2$/hr) | .036 | .036 | .036 | .036 |
| Accuracy of diffusion (%) | ±0 | ±50% | ±0 | ±50 |
| Source concentration (ppm) | 70,000 | 70,000 | 70,000 | 70,000 |
| Accuracy of measured source concentration value (%) | ±10 | ±30 | ±10 | ±30 |
| Number of independent calculations performed for each run | 5 | 5 | 5 | 5 |
| Maximum number of attempts per independent calculation to achieve error parameter | 5000 | 20,000 | 5000 | 20,000 |
| CODE OUTPUT | | | | |
| x(m) best fit | 32.89 | 33.09 | 33.10 | 31.97 |
| +/− range | 0.35 | 0.27 | 0.60 | 0.50 |
| z(m) best fit | −14.22 | −13.65 | −14.33 | −17.12 |
| +/− range | 0.93 | 0.35 | 0.51 | 0.59 |
| r(m) best fit | 0.12 | 0.10 | 1.17 | 0.34 |
| +/− range | 0.03 | 0.04 | 0.24 | 0.34 |
| t(days) best fit | 8.07 | 9.80 | 9.65 | 8.42 |
| +/− range | 0.65 | 1.28 | 1.13 | 0.96 |
| Co(ppm) best fit | 69527 | 52890 | 65483 | 68195 |
| +/− range | 3438 | 21320 | 6031 | 4610 |
| D(m$^{2/hr}$) best fit | 0.04 | 0/05 | 0.04 | 0.04 |
| +/− range | 0 | 0/01 | 0.00 | 0 |

To apply this approach to an existing emplaced barrier, one or several tracer gas injection points would be placed inside the contained volume. Monitoring points would be installed outside the contained volume at prescribed locations. The range of potential barrier installation configurations and proposed monitoring system configurations are shown in FIGS. 7(a)–(e). A multipoint soil gas sampling and analysis system would automatically sense tracer concentrations at the monitoring points ("M"). Tracer gas ("Inject") would be injected into the soil gas contained within the been used as a hydrologic tracer, attesting to its non-toxic and stable nature. See "The Use of Sulphur Hexafluoride as a Conservative Tracer in Saturated Sandy Media." Implementation issues are related to vapor point emplacement and soil gas monitoring techniques, each described below.

Vapor and injection point emplacement may be accomplished by a direct push emplacement tool. If the barrier is shallow (i.e., 10 to 20 ft deep), a manually operated system would suffice, such as the KVA vapor point system. As the emplacement depth increases or the geology becomes more resistive to vapor point emplacements, a Geoprobe truckmounted system would be required. For more difficult emplacements, cone penetrometer or ResonantSonic™ emplacements would be suitable. The latter technologies have been demonstrated to depths of 150 to 200 ft in Hanford, Wash. soils.

The spacing and configuration of the vapor point installations are critical to the effectiveness and cost of the monitoring system. By arranging the vapor points carefully it is possible to capitalize upon the distance sensitivity of the monitoring system.

Figure 8:
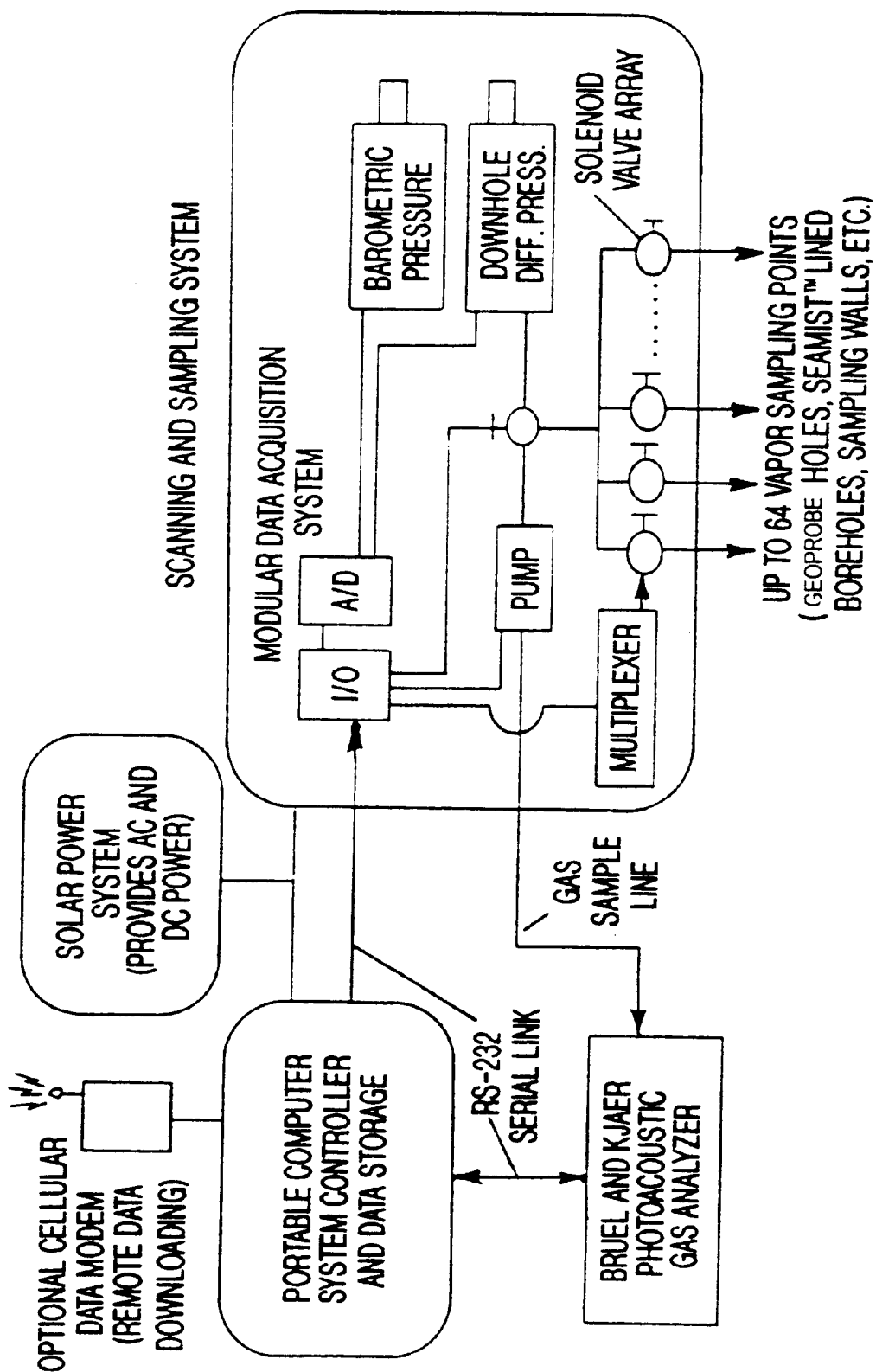
FIG. 8 is a schematic view of the multipoint tracer gas monitoring system of the present invention.

The tracer gas monitoring system must be capable of sampling multiple soil gas vapor lines and providing compositional analysis in real time. The Brüel & Kjær model 1302 photoacoustic gas analyzer is well-suited for unattended operation in field environments. It is automated to provide multipoint scanning system to map $SF_6$ tracer gas, chlorinated hydrocarbon, and $CO_2$ movement in the unsaturated zone. This system can automatically monitored up to 64 vapor sampling lines for several weeks, allowing measurement of gas diffusivity and monitoring of contaminant movement due to barometric pressure oscillations. The system is schematically shown in FIG. 8. The system is capable of unattended operation for long periods (weeks to several months). Sampling frequency is dictated by the number of vapor points monitored. In one application 45 vapor lines were sampled every 3 hours.

The Brüel & Kjær photoacoustic analyzer is well suited to $SF_6$ and $CO_2$ concentration measurements. It maintains a dynamic range of 3 to 5 orders of magnitude, and is capable of also measuring four other analytes in one sample (such as organic compounds). Less than half a liter of soil gas is required for each sample.

Figure 9:
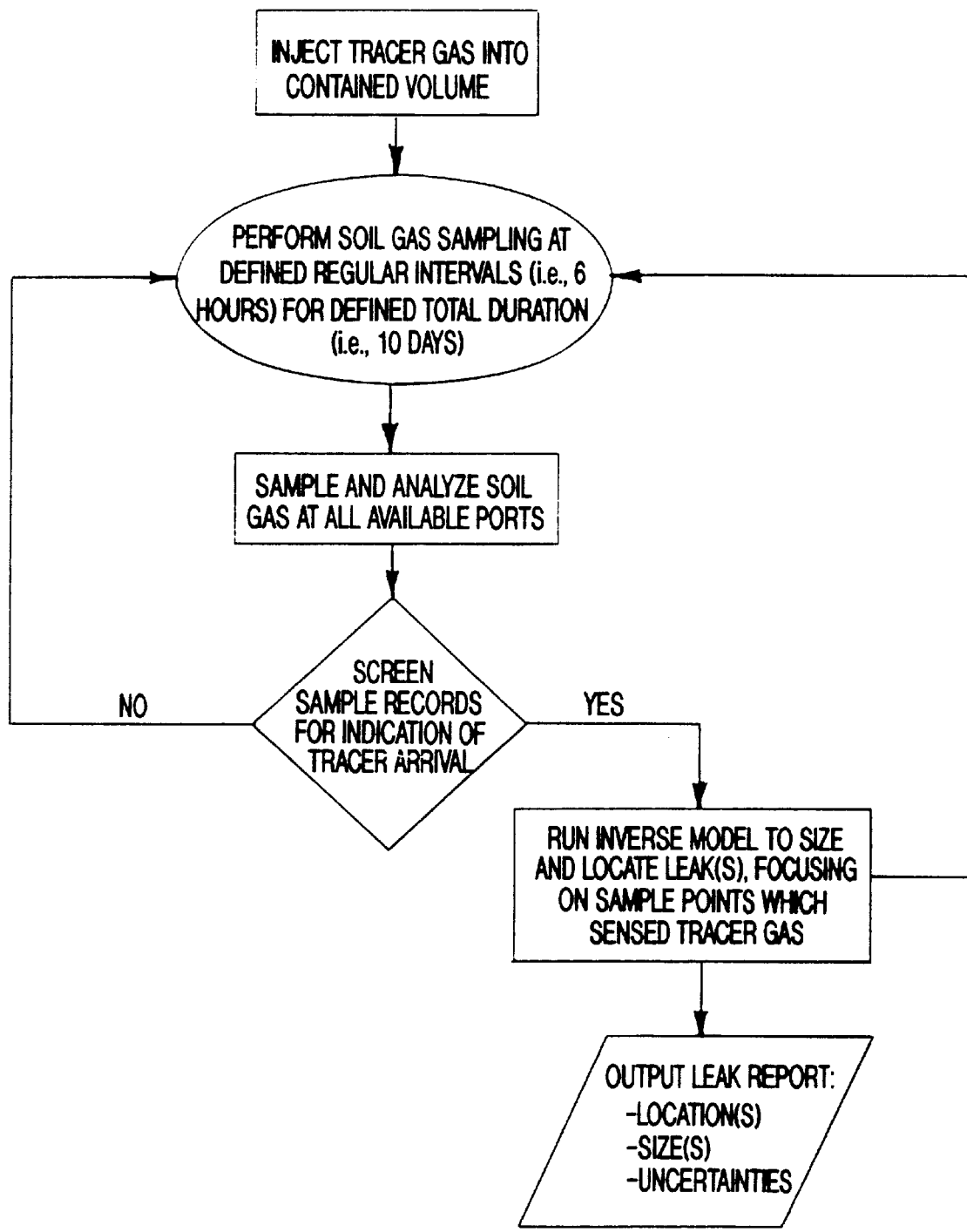
FIG. 9 is a schematic illustrating the barrier integrity monitoring system operational flow.

The scanning system is well-developed and its software tested in long duration field applications. The inverse modeling leak determination software runs on a standard personal computer. The data acquisition and leakage determination software have been designed for future integration into a common software application. The general flow of this operation is depicted in FIG. 9, showing the interaction between the software units.

Several design features need to be evaluated to substantiate this system's capability of both locating and determining the relative size of leaks in in-situ barriers. These issues include the characteristics of the tracer, the geologic medium in which the battier has been placed and through which the tracer diffuses, and the sampling system geometry.

The choice of tracer gas is dictated by the tracer's ability to delineate leaks in the barrier at reasonable cost and with relative ease of monitoring. The tracer must be non-hazardous, conservative, non-reactive, relatively inexpensive, readily available, and easily diagnosed with a field-rugged, stand-alone gas analysis system. Sulfur hexafluoride ($SF_6$) is a non-toxic conservative tracer gas commonly used in building ventilation testing as well as hydrologic measurements. Atmospheric background concentrations are on the order of 1 to 2 parts per trillion. $SF_6$ costs approximately $10/m^3$ at standard conditions. This compound has a molecular weight of 146, which is comparable to the molecular weight of the heavier chlorinated hydrocarbons frequently encountered at contaminated sites. This is a useful characteristic of the gas in that the test conducted using this tracer will be relevant to leaks of similar molecular weight vapors. The diffusion rates of gases in air are well-characterized as a function of their respective molecular weights. See "Fundamentals of Physical Chemistry," S. H. Maron and J. B. Lando, Case Western Reserve University, MacMillan Publishing Co., Inc., 1974. The diffusion constant of $SF_6$ is very close to that of trichlorethylene in air.

Another tracer gas which may satisfy the criteria for this test program is carbon dioxide, primarily due to its low cost ($1.75/m^3$) and ease of measurement. An attractive feature of $CO_2$ is that, because of its lower molecular weight, its diffusion rate will be almost twice that of $SF_6$. Carbon dioxide, while it exists naturally in air at concentrations of 300 to 500 parts per million (ppm), may be applicable to sites where very little organic contaminant is present in the soil, such as buried nuclear waste. This gas is only suitable under conditions where there is little or no microbial degradation of organic contaminants in the soil, (which would result in $CO_2$ generation).

Several parameters will impact the rate of tracer gas transport through the soil. One is the thermodynamic state of the soil gas (temperature and pressure). In most barrier applications these will not deviate enough from standard conditions to impact the diffusion constant. Cryogenically-cooled barriers, however, will result in soil gas temperature as low as $-30°$ C. According to a model based on kinetic theory and corresponding-states arguments, the diffusion constant is proportional to the absolute temperature raised to the power of 1.8 for a given binary gas mixture. See "Transport Phenomena," R. B. Bird, W. E. Stewart, and E. N. Lightfoot, University of Wisconsin, John Wiley & Sons, 1960. Consequently, cooling a binary mixture from $+20°$ C. to $-30°$ C. will reduce the diffusion constant to $(243/293)^{1.8}=0.71$ of its value at standard conditions. Temperature-induced density gradients will induce advective flow, which requires modeling to discern its impact on the overall transport.

A more variable influence is that of tortuosity, or the effective increase in the transport path in porous media caused by complicated pore structure. In the transport model, the (binary gas in air) diffusion constant is multiplied by the tortuosity to yield an effective diffusion constant. Tortuosity has been found to empirically follow the relation:

$$t(\text{tortuosity}) = (\text{soil porosity})^{1/3} (\text{soil gas saturation})^{7/3} \quad \text{[Eq. 9]}$$

where soil porosity represents the dry state and soil gas saturation is that fraction of the soil pores occupied by gas. With a typical range of porosities (0.2 to 0.5) and gas saturation (0.95 to 0.50) in typical and sites, this results in a range of tortuosity of 0.1 to 0.7. Knowing this we can bound the range of effective diffusion constants to be anticipated in the field. In any case, the diffusive transport characteristics of the soil should be measured in the site media prior to application of the above described assessment methodology.

Figure 10A:
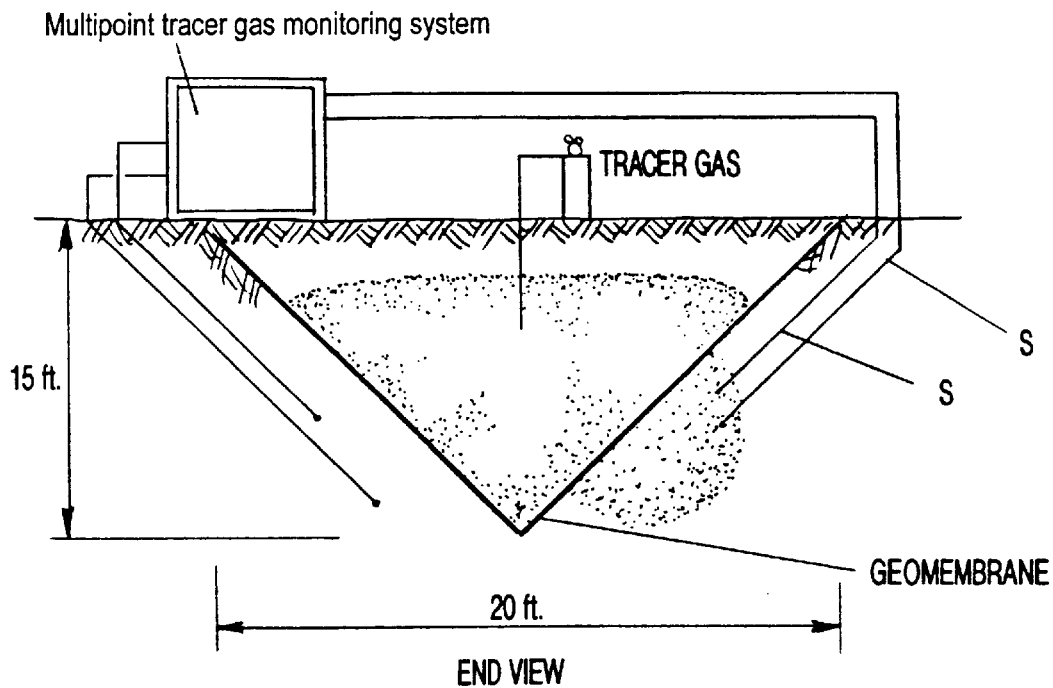
FIGS. 10(a)–(b) illustrate the end and side views of a test configuration.
Figure 10B:
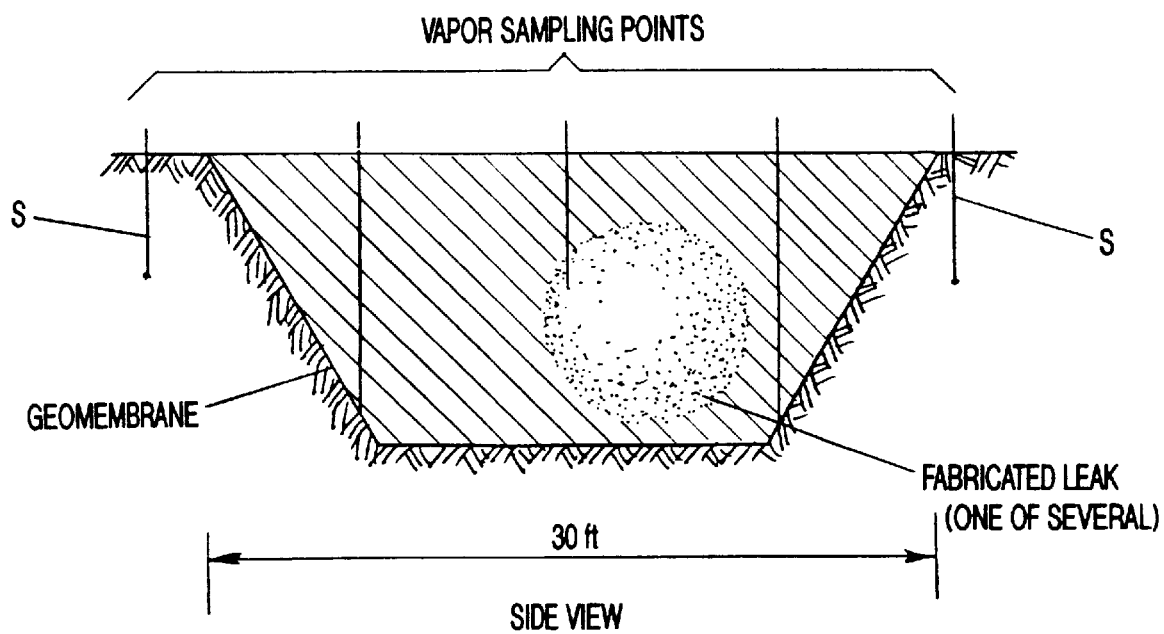

The number and geometry of the vapor sampling points must be optimized for the particular barrier installation. Increasing the number of sampling points will increase the precision of the leak location capability, but will also increase the costs of the overall emplacement. A test configuration is depicted in FIG. 10. It consists of trench excavated and lined with polyethylene geomembrane material. Holes have been formed, in various sizes and at various locations, in the geomembrane. Sampling tubing ("S") would be placed at various locations throughout the volume, and samples drawn from this array and analyzed with a photoacoustic gas analyzer over time. Prior to each test, an effective diffusion test is performed by injecting a known concentration of $SF_6$ into the volume and observing its diffusion.

A monitoring installation is designed for a specific barrier application. The first step is to design the vapor point installation to optimize vapor point spacing with respect to anticipated initial concentrations and anticipated response under given conditions. The second step is the installation of the vapor sampling points and monitoring system. This task is completed with a background survey to verify the monitoring system's installation and the integrity of the vapor sample point installation. The monitoring system is then operated for a one week period to verify that reasonable samples are being taken based on the in-situ gas composition. Once this verification is complete, leak testing begins. This starts with baseline data accumulation for a period of approximately a week, then initiation of the tracer gas injection, and subsequent monitoring by the multipoint scanning system described above. This testing would require one to three weeks. A second tracer injection could be used, using an alternate tracer such as carbon dioxide if the site conditions permit. This allows checking the initial results with a tracer whose diffusion constant is known to be higher than that of the initial tracer.

A test installation is depicted in FIG. 10. A geomembrane is installed, with fabricated holes of various sizes at various locations on its surface, in a trench which is then filled with soil. Vapor sampling and injection points are installed as shown. The integrated monitoring and data analysis system developed is connected to the sampling lines. The procedures for each test are basically identical:

1. Conduct baseline measurements of soil gas concentration for at least two days before injecting the tracer gas.
2. Review the baseline data for consistency to assure the monitoring system is operating correctly
3. Inject tracer gas ($SF_6$ or $CO_2$) into the contained volume to achieve the desired initial concentration.
4. Start the monitoring system operation, including the leak detection software module. At this point the system operates autonomously, calculating leak sizes and locations in real time as soil gas analysis is completed.
5. Run the test until the tracer gas concentrations in the soil drop to background levels.
6. Repeat the test at other initial tracer gas concentrations (e.g., sulfur hexafluoride: Initial concentration ($C_0$)= 5000, 25000, 50000 ppm; and carbon dioxide: Initial concentration ($C_0$)=5000, 25000, 50000 ppm).

Testing requires, approximately, a week total duration, including two days of background measurements and the balance of the week to run the injection and monitoring test. Some of the tests, however, may run for two weeks. The multipoint gas analysis system will collect and store all of the data required for these tests. This system records ambient temperature, barometric pressure, soil gas pressure at all of the sample points, and soil gas composition at all of the sample points in the soil. Several soil gas points will also draw gas from the soil inside the contained volume to measure $C_0$. This information will be collected a number (at least four) of times a day. The software module which determines the leak characteristics operates after soil gas analysis shows the presence of tracer gas at the vapor sampling points outside of the contained volume. This is done automatically, and the code outputs the leak sizes, locations, and uncertainties in these determinations. Data is transmitted or printed, then archived after each sampling and analysis sequence.

Whereas the drawings and accompanying description have shown and described the preferred embodiment of the present invention, it should be apparent to those skilled in the art that various changes may be made in the form of the invention without affecting the scope thereof.

We claim:

1. A method of determining the size and location of one or more leaks in a barrier in real time utilizing tracer gas identification outside of said barrier, said method comprising the steps of:
   (a) injecting at least one gas inside said barrier;
   (b) providing independent vapor sampling points at a plurality of positions outside of said barrier;
   (c) automatically collecting a plurality of independent discrete vapor samples from said vapor sampling points;
   (d) automatically analyzing said vapor samples with a gas analyzer and a computer to determine soil gas composition data at at least some of said vapor sealing points; and
   (e) automatically calculating with an algorithm the size and location of said leaks in real time.

2. The method of claim 1 wherein said barrier is a subsurface barrier.

3. The method of claim 1 wherein said steps of injecting said gas and providing said sampling points are accomplished using manually-operated direct push emplacement.

4. The method of claim 1 wherein said steps of injecting said gas and providing said sampling points are accomplished using standard rotational drilling techniques.

5. The method of claim 1 wherein said steps of injecting said gas and providing said sampling points are accomplished using a mounted mechanically-operated push emplacement.

6. The method of claim 1 wherein said steps of injecting said gas and providing said sampling points are accomplished using sonic emplacement.

7. The method of claim 1 wherein collecting said vapor samples is done using sample tubing.

8. The method of claim 1 wherein analyzing said samples is done using a photoacoustic gas analyzer.

9. The method of claim 1 wherein calculating the size and location of said leaks utilizes numerical inverse modeling.

10. The method of claim 9 wherein said numerical inverse modeling is achieved using nonlinear global optimization which is solved using simulated annealing techniques.

11. The method of claim 1 wherein said gas is selected from the group consisting of $SF_6$ and $CO_2$.

12. The method of claim 1 which further comprises
   (f) repeating steps a–e with a further gas chemically distinguishable from the gas or gases of step (a).

13. The method of claim 1 wherein said location of each of said leaks is determined by analysis of at least three of said vapor samples.

14. The method of claim 13 wherein said location is determined by triangulation of said three vapor samples.

15. The method of claim 1 wherein said size of said leak is determined by evaluating the magnitude of said gas in said vapor samples.

16. A multipoint tracer gas monitoring system utilizing detection of at least one tracer gas outside of a barrier said system comprising:

(a) means for injecting at least one tracer gas inside a barrier;

(b) means, outside a barrier, for automatically collecting discrete gas samples from a plurality of independent positions;

(c) a gas analyzer for analyzing said samples, coupled to said means for collecting, to automatically determine gas composition data at least some of such positions; and (d) a computer including an algorithm for calculating the size and location of leaks in said barrier in real time.

17. The system of claim 16 wherein said barrier is a subsurface barrier.

18. The system of claim 16 wherein said means for injecting said gas is accomplished using manually-operated direct push emplacement.

19. The system of claim 16 wherein said means for injecting said gas is accomplished using standard rotational drilling techniques.

20. The system of claim 16 wherein said means for injecting said gas is accomplished using a mounted mechanically-operated push emplacement.

21. The system of claim 16 wherein said means for injecting said gas is accomplished using sonic emplacement.

22. The system of claim 16 wherein said means for collecting said samples is sample tubing.

23. The system of claim 16 wherein said gas analyzer is a photoacoustic gas analyzer.

24. The system of claim 16 wherein said computer calculates the size and location of said leaks utilizing numerical inverse modeling.

25. The system of claim 24 wherein said numerical inverse modeling is achieved using nonlinear global optimization which is solved using simulated annealing techniques.

26. The system of claim 16 wherein said gas is selected from the group consisting of $SF_6$ and $CO_2$.

27. The system of claim 16 which further comprises (f) means for repeating steps a–d with a further gas chemically distinguishable from the gas or gases of step (a).

28. The method of claim 9, wherein said inverse modeling is numerical.

29. The system of claim 24 wherein said inverse modeling is numerical.

* * * * *